US011699384B2

(12) United States Patent
Jang et al.

(10) Patent No.: US 11,699,384 B2
(45) Date of Patent: Jul. 11, 2023

(54) DISPLAY DEVICE

(71) Applicant: LG Display Co., Ltd., Seoul (KR)

(72) Inventors: Hoon Jang, Goyang-si (KR); Sang-Uk Lee, Seoul (KR); Taehwa Park, Bucheon-si (KR); SoonDong Cho, Gumi-si (KR); Wonyong Jang, Bucheon-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 17/941,903

(22) Filed: Sep. 9, 2022

(65) Prior Publication Data
US 2023/0154381 A1    May 18, 2023

(30) Foreign Application Priority Data

Nov. 17, 2021    (KR) .......................... 10-2021-0158721

(51) Int. Cl.
*G09G 3/20*    (2006.01)
(52) U.S. Cl.
CPC ... *G09G 3/2096* (2013.01); *G09G 2310/0291* (2013.01); *G09G 2310/0297* (2013.01); *G09G 2330/021* (2013.01); *G09G 2360/10* (2013.01)
(58) Field of Classification Search
None
See application file for complete search history.

(56) References Cited

U.S. PATENT DOCUMENTS

| 2015/0188431 A1* | 7/2015 | Cho ..................... G09G 3/3225 345/212 |
| 2022/0208086 A1* | 6/2022 | Klement .............. G09G 3/3208 |

FOREIGN PATENT DOCUMENTS

| JP | 6149677 B2 | 6/2017 |
| KR | 10-2003688 B1 | 7/2019 |

* cited by examiner

*Primary Examiner* — Chad M Dicke
(74) *Attorney, Agent, or Firm* — Birch, Stewart, Kolasch & Birch, LLP

(57) ABSTRACT

A display device can include a display panel having a plurality of pixels disposed on a substrate, and a power supplier configured to supply a driving voltage to the display panel. The power supplier can include a first converter configured to receive an input voltage supplied from an external system and convert the input voltage into a boost voltage, a second converter configured to convert the boost voltage into the driving voltage, a first feedback unit configured to output a first pulse width modulation (PWM) signal to the first converter so that the boost voltage is proportional to a first reference voltage, and a second feedback unit configured to output a second PWM signal to the second converter so that the driving voltage is proportional to a second reference voltage.

20 Claims, 15 Drawing Sheets

DISPLAY DEVICE

CROSS-REFERENCE TO RELATED APPLICATIONS

This application claims priority to Korean Patent Application No. KR 10-2021-0158721, filed on Nov. 17, 2021, in the Korean Intellectual Property Office, the entire disclosure of which is hereby expressly incorporated by reference into the present application.

BACKGROUND

Field

The present disclosure relates to a display device including a plurality of power converters.

Description of the Related Art

As the information-oriented society is implemented, there is an increasing demand for various display devices for displaying images. Recently, various display devices such as a liquid crystal display (LCD) device, a plasma display panel (PDP), and an organic light-emitting display (OLED) device have been used.

Further, the display device includes a power supply that generates drive power required for operation. The power supply includes a plurality of power converters that converts input power, which is supplied from an external system, into drive power required to operate the display device. Further, the input power is direct current power, and the drive power, which is the output power, is also direct current power. Therefore, the power supply can be a DC/DC power converter.

Meanwhile, the external systems connected to the power supply can be various types of power system such as a power battery and a power adapter. Further, the input power supplied from the power battery can be lower than the input power supplied from the power adapter. For example, a level of the input power supplied to the power supply can vary depending on situations.

Power conversion efficiency of the power supply varies as the input power of the power supply varies as described above. For this reason, there can be a limitation in that the efficiency of the power supply may deteriorate, which can increase the power consumption of the display device.

SUMMARY OF THE DISCLOSURE

An object to be achieved by the present disclosure is to provide a display device in which power conversion efficiency of a power supply is improved.

Another object to be achieved by the present disclosure is to provide a display device capable of changing a boost voltage of the power supply.

Objects of the present disclosure are not limited to the above-mentioned objects, and other objects, which are not mentioned above, can be clearly understood by those skilled in the art from the following descriptions.

According to an aspect of the present disclosure, a display device includes a display panel having plurality of pixels disposed on a substrate, and a power supplier configured to supply a driving voltage to the display panel. The power supplier can include a first converter configured to receive an input voltage supplied from an external system and convert the input voltage into a boost voltage, a second converter configured to convert the boost voltage into the driving voltage, a first feedback unit configured to output a first pulse width modulation (PWM) signal to the first converter so that the boost voltage is proportional to a first reference voltage, a second feedback unit configured to output a second PWM signal to the second converter so that the driving voltage is proportional to a second reference voltage, and a reference voltage calculator configured to receive the input voltage and the driving voltage and supply the first reference voltage to the first feedback unit. Therefore, it is possible to improve the power conversion efficiency of the power supplier.

According to another aspect of the present disclosure, a display device includes a display panel having a plurality of pixels disposed on a substrate, and a power supplier configured to supply a driving voltage to the display panel. The power supplier can include a first converter configured to convert an input voltage, which is supplied from an external system, into a boost voltage, a second converter configured to convert the boost voltage into the driving voltage, a first feedback unit configured to control the first converter so that the first converter outputs the boost voltage, a second feedback unit configured to control the second converter so that the second converter outputs the driving voltage, and a feedback voltage calculator configured to calculate a feedback voltage from the input voltage and the driving voltage.

The first feedback unit can include a plurality of resistors, a first amplifier, and a first PWM generator. A first reference voltage is applied to a non-inverting terminal of the first amplifier, an inverting terminal of the first amplifier is connected to the feedback voltage calculator through any one of the plurality of resistors, and the first PWM generator outputs a first PWM signal to the first converter so that the boost voltage is proportional to the first reference voltage. Therefore, it is possible to improve the power conversion efficiency of the power supplier.

Other matters of the exemplary embodiments are included in the detailed description and the drawings.

The present disclosure can increase final efficiency of the power supplier by changing the boosted voltage depending on the input voltage and the driving voltage.

The present disclosure can minimize power consumption caused by a ripple by suppressing the occurrence of the ripple by bypassing the input voltage as the boost voltage.

The effects according to the present disclosure are not limited to the contents exemplified above, and more various effects are included in the present specification.

BRIEF DESCRIPTION OF THE DRAWINGS

The above and other aspects, features and other advantages of the present disclosure will be more clearly understood from the following detailed description taken in conjunction with the accompanying drawings, in which.

DETAILED DESCRIPTION OF THE EMBODIMENTS

Figure 1:
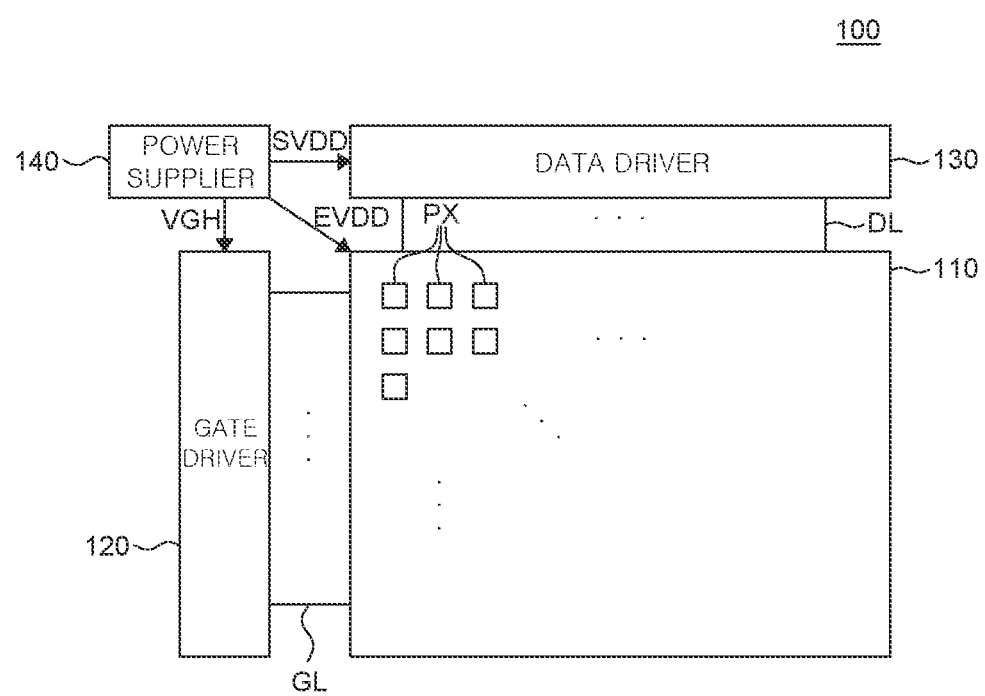
FIG. 1 is a block diagram for explaining a display device according to an embodiment of the present disclosure.

Advantages and characteristics of the present disclosure and a method of achieving the advantages and characteristics will be clear by referring to exemplary embodiments described below in detail together with the accompanying drawings. However, the present disclosure is not limited to the exemplary embodiments disclosed herein but will be implemented in various forms. The exemplary embodiments are provided by way of example only so that those skilled in the art can fully understand the disclosures of the present disclosure and the scope of the present disclosure. Therefore, the present disclosure will be defined only by the scope of the appended claims.

The shapes, sizes, ratios, angles, numbers, and the like illustrated in the accompanying drawings for describing the exemplary embodiments of the present disclosure are merely examples, and the present disclosure is not limited thereto. Like reference numerals generally denote like elements throughout the specification. Further, in the following description of the present disclosure, a detailed explanation of known related technologies can be omitted to avoid unnecessarily obscuring the subject matter of the present disclosure. The terms such as "including," "having," and "consist of" used herein are generally intended to allow other components to be added unless the terms are used with the term "only". Any references to singular can include plural unless expressly stated otherwise.

Components are interpreted to include an ordinary error range even if not expressly stated.

When the position relation between two parts is described using the terms such as "on", "above", "below", and "next", one or more parts can be positioned between the two parts unless the terms are used with the term "immediately" or "directly".

When an element or layer is disposed "on" another element or layer, another layer or another element can be interposed directly on the other element or therebetween.

Although the terms "first", "second", and the like are used for describing various components, these components are not confined by these terms. These terms are merely used for distinguishing one component from the other components, and may not define order. Therefore, a first component to be mentioned below can be a second component in a technical concept of the present disclosure.

Like reference numerals generally denote like elements throughout the specification.

A size and a thickness of each component illustrated in the drawing are illustrated for convenience of description, and the present disclosure is not limited to the size and the thickness of the component illustrated.

The features of various embodiments of the present disclosure can be partially or entirely adhered to or combined with each other and can be interlocked and operated in technically various ways, and the embodiments can be carried out independently of or in association with each other. Further, all components of each display device according to all embodiments of the present disclosure are operatively coupled and configured.

FIG. 1 is a block diagram for explaining a display device according to an embodiment of the present disclosure.

Referring to FIG. 1, a display device 100 includes a display panel 110, a gate drive part (gate driver) 120, a data drive part (data driver) 130, and a power supplier (power supplying part) 140.

The display panel 110 includes a substrate made of glass or plastic, and a plurality of gate lines GL and a plurality of data lines DL that intersect one another on the substrate. A plurality of pixels PX is provided at intersection points between the plurality of gate line GL and the plurality of data lines DL. Further, an area in which the plurality of pixels PX for implementing images is disposed can be referred to as a display area. An area disposed at an outer periphery of the display area and having no pixel PX can be referred to as a non-display area.

The plurality of pixels PX of the display panel 110 can each have at least one thin-film transistor.

Further, in a case in which the display device 100 according to the embodiment of the present disclosure is an electroluminescent display device, electric currents are applied to electroluminescent diodes provided in the plurality of pixels PX, and emitted electrons and holes are combined, such that excitons are produced. Further, the excitons emit light, thereby implementing gradations of the display device 100.

However, the display device 100 according to the embodiment of the present disclosure is not limited to an electroluminescent display device. The display device 100 can be one of the display devices, such as a liquid crystal display device, having various shapes.

The gate drive part 120 sequentially supplies the gate line GL with gate voltages such as an ON-voltage or an OFF-voltage in response to the gate control signal outputted from a timing controller.

The gate control signals include a gate start pulse, a gate shift clock, a gate output enable signal, and the like.

The gate start pulse controls operation start timing of one or more gate circuits that constitute the gate drive part 120. The gate shift clock is a clock signal inputted in common to the one or more gate circuits and controls shift timing of a scan signal (gate pulse). The gate output enable signal assigns timing information of the one or more gate circuits.

The gate drive part 120 can be positioned only at one side of the display panel 110 or at two opposite sides of the display panel 110 in some instances depending on driving methods.

The gate drive part 120 can include a shift register, a level shifter, and the like.

Based on the data control signal, the data drive part 130 converts the image data, which are received from the timing controller, into the analog data voltages Vdata and outputs the analog data voltages Vdata to the data line DL.

The data control signal includes a source start pulse, a source sampling clock, a source output enable signal, and the like.

The source start pulse controls data sampling start timing of the one or more data circuits that constitute the data drive part 130. The source sampling clock is a clock signal for controlling the sampling timing of data for each data circuit. The source output enable signal controls output timing of the data drive part 130.

The data drive part 130 can be connected to a bonding pad of the display panel 110 by a tape automated bonding method or a chip-on glass method or disposed directly on the display panel 110. In some instances, the data drive part 130 can be integrated on the display panel 110.

The data drive part 130 can include an output buffer, a digital analog converter (DAC), and a logic part including various circuits such as a level shifter and a latch part.

The power supplier 140 can convert an input voltage, which is supplied from an external system, into a driving voltage required to operate the display device 100. Specifically, the power supplier 140 converts the input voltage and outputs a gate high-potential voltage VGH, a source high-potential voltage SVDD, and a drive high-potential voltage EVDD. The gate high-potential voltage VGH is a voltage used to generate a gate voltage and is supplied to the gate drive part 120. The source high-potential voltage SVDD is a high-potential power voltage applied to a gamma voltage divider circuit of the data drive part 130 that generates gamma reference voltages. The source high-potential voltage is supplied to the data drive part 130. The drive high-potential voltage EVDD is a voltage applied to an electroluminescent diode included in each of the plurality of pixels PX and is supplied to the plurality of pixels PX.

Figure 2:
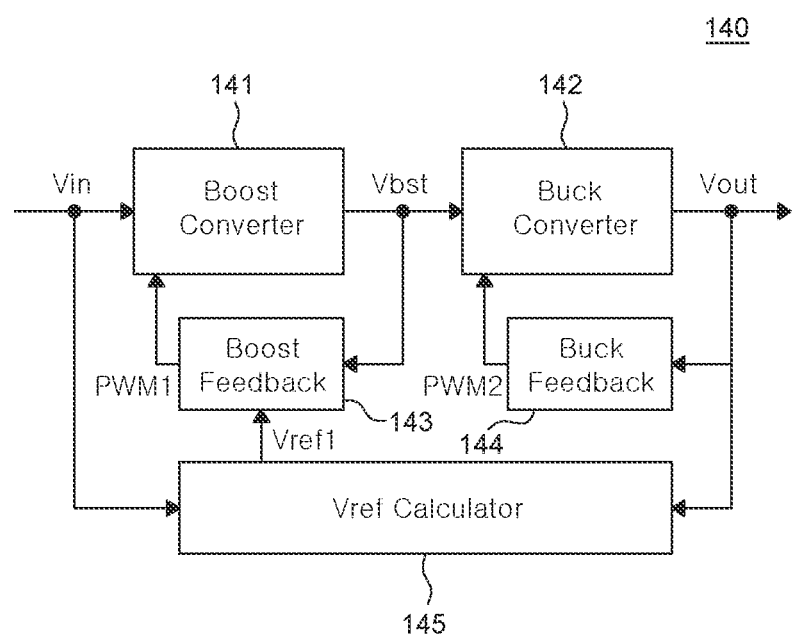
FIG. 2 is a block diagram of a power supplier of the display device according to the embodiment of the present disclosure.

FIG. 2 is a block diagram of a power supplier of the display device according to the embodiment of the present disclosure.

Referring to FIG. 2, the power supplier 140 includes a first converter (boost converter) 141, a second converter (buck converter) 142, a first feedback unit (boost feedback) 143, a second feedback unit (buck feedback) 144, and a reference voltage calculator (Vref calculator) 145.

The first converter 141 raises an input voltage Vin, which is supplied from the external system to a boost voltage Vbst. For example, the first converter 141 can be a boost converter or a step-up converter that converts the input voltage Vin into the boost voltage Vbst by raising the input voltage Vin.

The second converter 142 lowers the raised boost voltage Vbst to a driving voltage Vout required for the display device 100. For example, the second converter 142 can be a buck converter or a step-down converter that converts the boost voltage Vbst into the driving voltage Vout by lowering the boost voltage Vbst.

The first feedback unit 143 senses and controls the boost voltage Vbst so that the first converter 141 outputs the constant boost voltage Vbst. For example, the first feedback unit 143 generates a first pulse width modulation (PWM) signal PWM1 and outputs the first PWM signal PWM1 to the first converter 141 so that the boost voltage Vbst can be maintained at a predetermined level in proportion to a first reference voltage Vref1.

The second feedback unit 144 senses and controls the driving voltage Vout so that the second converter 142 can maintain the constant driving voltage Vout. For example, the second feedback unit 144 generates a second PWM signal PWM2 and outputs the second PWM signal PWM2 to the second converter 142 so that the driving voltage Vout can be maintained at a predetermined level in accordance with a second reference voltage.

The reference voltage calculator 145 calculates the first reference voltage Vref1 and outputs the first reference voltage Vref1 to the first feedback unit 143 so that the power supplier 140 can operate in maximum efficiency. For example, the reference voltage calculator 145 receives the input voltage Vin and the driving voltage Vout, calculates the first reference voltage Vref1 in accordance with the input voltage Vin and the driving voltage Vout, and outputs the first reference voltage Vref1 to the first feedback unit 143.

Hereinafter, specific circuit configurations of the first converter 141, the second converter 142, the first feedback unit 143, the second feedback unit 144, and the reference voltage calculator 145 will be described with reference to FIG. 3.

Figure 3:
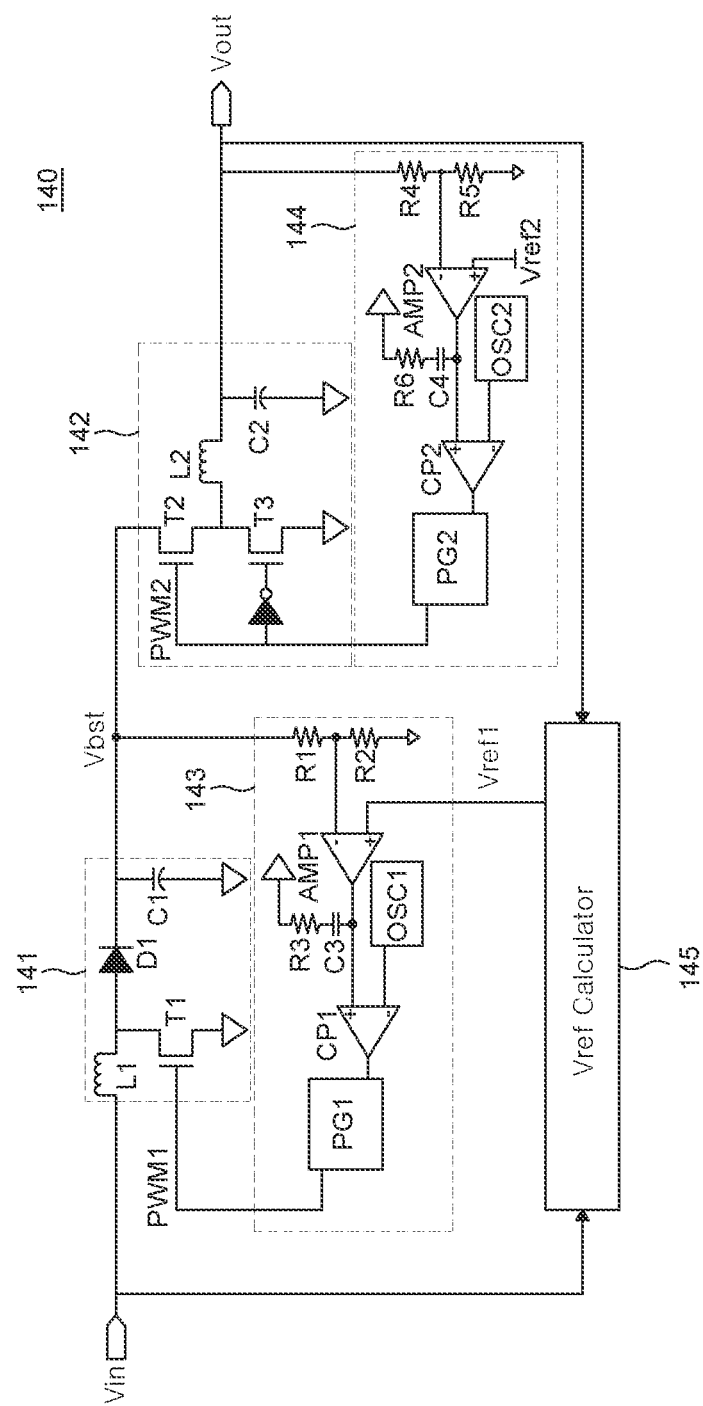
FIG. 3 is a circuit diagram of the power supplier of the display device according to the embodiment of the present disclosure.

FIG. 3 is a circuit diagram of the power supplier of the display device according to the embodiment of the present disclosure.

Referring to FIG. 3, the first converter 141 includes a first inductor L1, a first diode D1, a first transistor T1, and a first capacitor C1.

The input voltage Vin is applied to one end of the first inductor L1, and the first diode D1 and the first transistor T1 are connected to the other end of the first inductor L1. Further, the first inductor L1 is connected to an anode electrode of the first diode D1. The first capacitor C1, the second converter 142, and the first feedback unit 143 are connected to a cathode electrode of the first diode D1. Further, a gate electrode of the first transistor T1 is connected to the first feedback unit 143. A source electrode of the first transistor T1 is connected to the first inductor L1 and the first diode D1. A drain electrode of the first transistor T1 is grounded.

Therefore, the first PWM signal PWM1 outputted from the first feedback unit 143 controls the first transistor T1, such that the first converter 141 can generate the boost voltage Vbst by using the first inductor L1 and the first diode D1.

Referring to FIG. 3, the second converter 142 includes a second inductor L2, a second transistor T2, a third transistor T3, and a second capacitor C2.

The boost voltage Vbst is applied to one end of the second inductor L2 through the second transistor T2. The second capacitor T2 is connected to the other end of the second inductor L2. Further, a gate electrode of the second transistor T2 is connected to the second feedback unit 144. A source electrode of the second transistor T2 is connected to the first converter 141. A drain electrode of the second transistor T2 is connected to the second inductor L2. Further, a gate electrode of the third transistor T3 is connected to the second feedback unit 144 through an inverter. A source electrode of the third transistor T3 is connected to the second inductor L2. A drain electrode of the third transistor T3 is grounded.

Therefore, the second PWM signal PWM2 outputted from the second feedback unit 144 controls the second transistor T2 and the third transistor T3, such that the second converter 142 can generate the driving voltage Vout by using the second inductor L2.

Referring to FIG. 3, the first feedback unit 143 includes a plurality of resistors R1, R2, and R3, a third capacitor C3, a first amplifier AMP1, a first oscillator OSC 1, a first comparator CP1, and a first PWM generator PG1.

The first resistor R1 and the second resistor R2 are connected in series. The first resistor R1 and the second resistor R2, which are connected in series, are connected between an output port of the first converter 141 and a grounding terminal. Therefore, the first resistor R1 and the second resistor R2, which are connected in series, serve as voltage distributors that distribute the boost voltage Vbst. Therefore, the boost voltage Vbst distributed between the first resistor R1 and the second resistor R2 can be expressed as R2/(R1+R2)*Vbst.

The first resistor R1 and the second resistor R2 can be connected to an inverting terminal of the first amplifier AMP1, and the distributed boost voltage (R2/(R1+R2)*Vbst) can be applied. Further, the reference voltage calculator 145 can be connected to a non-inverting terminal of the first amplifier AMP1, and the first reference voltage Vref1 can be applied. Further, because the voltage at the inverting terminal of the first amplifier AMP1 and the voltage at the non-inverting terminal of the first amplifier AMP1 are equal to each other, the first reference voltage Vref1 can be the distributed boost voltage (R2/(R1+R2)*Vbst). Further, the third resistor R3 and the third capacitor C3, which are connected in series, are connected to an output terminal of the first amplifier AMP1, thereby stabilizing an output voltage of the first amplifier AMP1. For example, the first amplifier AMP1 derives a difference value between the distributed boost voltage (R2/(R1+R2)*Vbst) and the first reference voltage Vref1 and outputs an amplified value of the difference value.

A first oscillator OSC1 can be connected to the inverting terminal of the first comparator CP1, such that a triangular wave outputted from the first oscillator OSC1 can be applied. Further, the first amplifier AMP1 can be connected to the non-inverting terminal of the first comparator CP1, such that an output value of the first amplifier AMP1 can be applied. Further, the first PWM generator PG1 is connected to the output terminal of the first amplifier AMP1. For example, the first comparator CP1 outputs, to the first PWM generator PG1, a result value made by comparing the output value of the first amplifier AMP1 with the triangular wave outputted from the first oscillator OSC1.

The first PWM generator PG1 receives the output value of the first comparator CP1 and outputs, to the first converter 141, the first PWM signal PWM1 having a duty made by reflecting the output value of the first comparator CP1. Therefore, the first transistor T1 of the first converter 141 performs an ON/OFF switching operation corresponding to the first PWM signal PWM1, such that the first converter 141 converts the input voltage Vin to the boost voltage Vbst in accordance with the duty of the first PWM signal PWM1.

Referring to FIG. 3, the second feedback unit 144 includes a plurality of resistors R4, R5, and R6, a fourth capacitor C4, a second amplifier AMP2, a second oscillator OSC 2, a second comparator CP2, and a second PWM generator PG2.

The fourth resistor R4 and the fifth resistor R5 are connected in series. Further, the fourth resistor R4 and the fifth resistor R5, which are connected in series, are connected between an output port of the second converter 142 and the grounding terminal. Therefore, the fourth resistor R4 and the fifth resistor R5, which are connected in series, serve as voltage distributors that distribute the driving voltage Vout. Therefore, the driving voltage Vout distributed between the fourth resistor R4 and the fifth resistor R5 can be expressed as R5/(R4+R5)*Vout.

The fourth resistor R4 and the fifth resistor R5 are connected to an inverting terminal of the second amplifier AMP2, such that the distributed driving voltage (R5/(R4+R5)*Vout) can be applied. Further, a second reference voltage Vref2 for outputting the driving voltage Vout can be applied to a non-inverting terminal of the second amplifier AMP2. Because the voltage at the inverting terminal of the second amplifier AMP2 and the voltage at the non-inverting terminal of the second amplifier AMP2 are equal to each other, the second reference voltage Vref2 can be the distributed driving voltage (R5/(R4+R5)*Vout). Further, the sixth resistor R6 and the fourth capacitor C4, which are connected in series, are connected to an output terminal of the second amplifier AMP2, thereby stabilizing an output voltage of the second amplifier AMP2. For example, the second amplifier AMP2 derives a difference value between the distributed driving voltage (R5/(R4+R5)*Vout) and the second reference voltage Vref2 and outputs an amplified value of the difference value.

A second oscillator OSC2 is connected to the inverting terminal of the second comparator CP2, such that a triangular wave outputted from the second oscillator OSC2 can be applied. Further, the second amplifier AMP2 can be connected to the non-inverting terminal of the second comparator CP2, such that an output value of the second amplifier AMP2 can be applied. Further, the second PWM generator PG2 is connected to the output terminal of the second amplifier AMP2. For example, the second comparator CP2 outputs a result value made by comparing the output value of the second amplifier AMP2 with the triangular wave outputted from the second oscillator OSC2.

The second PWM generator PG2 receives the output value of the second comparator CP2 and outputs, to the second converter 142, the second PWM signal PWM2 having a duty made by reflecting the output value of the second comparator CP2. Therefore, the second transistor T2 of the second converter 142 performs an ON/OFF switching operation corresponding to the second PWM signal PWM2, such that the second converter 142 converts the boost voltage Vbst into the driving voltage Vout in accordance with the duty of the second PWM signal PWM2.

Figure 4:
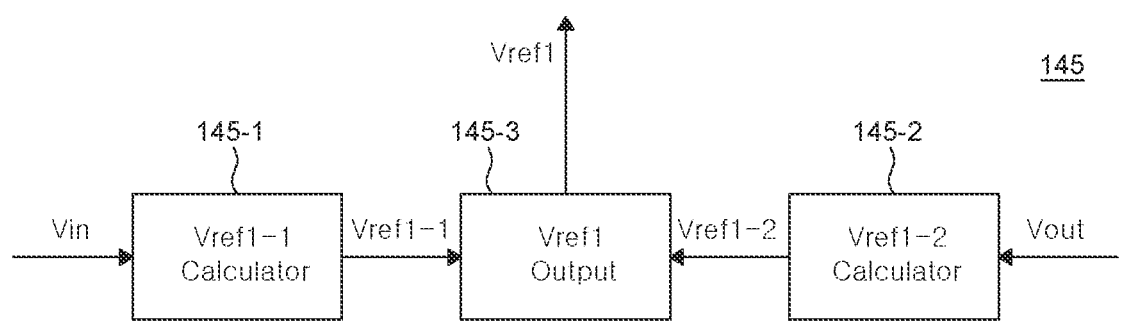
FIG. 4 is a top plan view illustrating a printed circuit board having the power supplier of the display device according to the embodiment of the present disclosure.

FIG. 4 is a block diagram of the reference voltage calculator of the display device according to the embodiment of the present disclosure.

Figure 5:
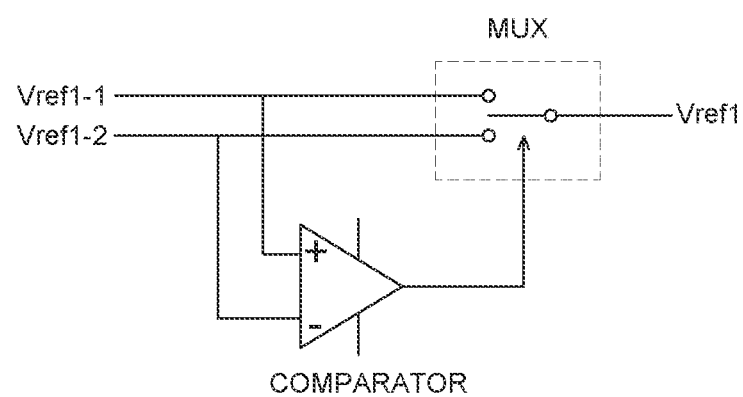
FIG. 5 is a circuit diagram of a first reference voltage output part of the display device according to the embodiment of the present disclosure.

FIG. 5 is a circuit diagram of a first reference voltage output part of the display device according to the embodiment of the present disclosure.

Referring to FIGS. 4 and 5, the reference voltage calculator 145 includes a 1-1 reference voltage calculator 145-1, a 1-2 reference voltage calculator 145-2, and a first reference voltage output part 145-3.

The 1-1 reference voltage calculator 145-1 receives the input voltage Vin and converts the input voltage Vin into a 1-1 reference voltage Vref1-1. The 1-1 reference voltage Vref1-1 means a minimum voltage that allows the first converter 141 to operate.

Specifically, the first PWM signal PWM1 having a duty Dmin equal to or larger than a predetermined duty needs to be inputted to operate the first converter 141. The minimum duty of the first PWM signal PWM1 for operating the first converter 141 can be defined as a first duty Dmin. The first duty Dmin can be derived as a ratio between a minimum ON time of the first PWM signal PWM1 and a switching cycle of the first PWM signal PWM1.

For example, the first duty Dmin can be expressed as Equation 1 below.

$$Dmin=Tmin\_on/Tpwm1 \quad \text{[Equation 1]}$$

In the above, Tmin_on represents the minimum ON time of the first PWM signal PWM1, and Tpwm1 represents the switching cycle of the first PWM signal PWM1.

Further, a relationship formula of the input voltage Vin and the boost voltage Vbst, which are the input and output voltages of the first converter 141, can be expressed as Equation 2.

$$Vbst/Vin=1/(1-Dmin) \quad \text{[Equation 2]}$$

Therefore, the boost voltage Vbst outputted from the first converter 141 is expressed as Vin/(1−Dmin).

Meanwhile, the distributed boost voltage (R2/(R1+R2)*Vbst) can be applied to the inverting terminal of the first amplifier AMP1. The 1-1 reference voltage Vref1-1, which is any one of the first reference voltages Vref1, can be applied to the non-inverting terminal of the first amplifier AMP1. The voltage at the inverting terminal of the first amplifier AMP1 and the voltage at the non-inverting terminal of the first amplifier AMP1 are equal to each other. For example, the 1-1 reference voltage Vref1-1 and the distributed boost voltage (R2/(R1+R2)*Vbst) are equal to each other.

Therefore, the 1-1 reference voltage Vref1-1 for operating the first converter 141 can be derived as R2/(R1+R2)*Vin/(1−Dmin) by using Equation 2.

For example, the 1-1 reference voltage calculator 145-1 can receive the input voltage Vin and set the 1-1 reference voltage Vref1-1 to R2/(R1+R2)*Vin/(1−Dmin).

The 1-2 reference voltage calculator 145-2 receives the driving voltage Vout and converts the driving voltage Vout into a 1-2 reference voltage Vref1-2. The 1-2 reference voltage Vref1-2 means a minimum voltage that allows the second converter 142 to operate.

Specifically, the second PWM signal PWM2 having a duty equal to or smaller than a predetermined duty Dmax needs to be inputted to operate the second converter 142. The maximum duty of the second PWM signal PWM2 for operating the second converter 142 can be defined as a second duty Dmax. The second duty Dmax can be derived as a ratio between a minimum OFF time of the second PWM signal PWM2 and a switching cycle of the second PWM signal PWM2.

For example, the second duty Dmax can be expressed as Equation 3 below.

$$Dmax=1-(Tmin\_off/Tpwm2) \quad \text{[Equation 3]}$$

In the above, Tmin_off represents the minimum OFF time of the second PWM signal PWM2, and Tpwm2 represents the switching cycle of the second PWM signal PWM2.

Further, a relationship formula of the boost voltage Vbst and the driving voltage Vout, which are the input and output voltages of the second converter 142, can be expressed as Equation 4.

$$Vout/Vbst=Dmax \quad \text{[Equation 4]}$$

Therefore, the boost voltage Vbst inputted from the second converter (boost converter) 142 can be expressed as Vout/Dmax.

Meanwhile, the distributed boost voltage (R2/(R1+R2)*Vbst) can be applied to the inverting terminal of the first amplifier AMP1. The 1-2 reference voltage Vref1-2, which is any one of the first reference voltages Vref1, can be applied to the non-inverting terminal of the first amplifier AMP1. The voltage at the inverting terminal of the first amplifier AMP1 and the voltage at the non-inverting terminal of the first amplifier AMP1 are equal to each other. For example, the 1-2 reference voltage Vref1-2 and the distributed boost voltage (R2/(R1+R2)*Vbst) are equal to each other.

Therefore, the 1-2 reference voltage Vref1-2 for operating the second converter 142 can be derived as R2/(R1+R2)*Vout/Dmax by using Equation 4.

For example, the 1-2 reference voltage calculator 145-2 can receive the driving voltage Vout and set the 1-2 reference voltage Vref1-2 to R2/(R1+R2)*Vout/Dmax.

The first reference voltage output part 145-3 outputs a larger value between the 1-1 reference voltage Vref1-1 and the 1-2 reference voltage Vref1-2, as the first reference voltage Vref1. As described above, the 1-1 reference voltage calculator 145-1 derives the 1-1 reference voltage Vref1-1 that is a minimum voltage for operating the first converter 141. The 1-2 reference voltage calculator 145-2 derives the 1-2 reference voltage Vref1-2 that is a minimum voltage for operating the second converter 142. Further, both the first converter 141 and the second converter 142 need to operate to operate the power supplier 140.

Therefore, the first reference voltage output part 145-3 outputs a larger value between the 1-1 reference voltage Vref1-1 and the 1-2 reference voltage Vref1-2, as the first reference voltage Vref1, in order to operate both the first converter 141 and the second converter 142.

The first reference voltage output part 145-3 includes a multiplexer MUX and a comparator that receive the 1-1 reference voltage Vref1-1 and the 1-2 reference voltage Vref1-2.

The comparator compares the 1-1 reference voltage Vref1-1 and the 1-2 reference voltage Vref1-2 and outputs a comparison result value to the multiplexer MUX.

Further, depending on the result value of the comparator, the multiplexer MUX outputs a voltage having higher electric potential between the 1-1 reference voltage Vref1-1 and the 1-2 reference voltage Vref1-2, as the first reference voltage Vref1.

Figure 6:
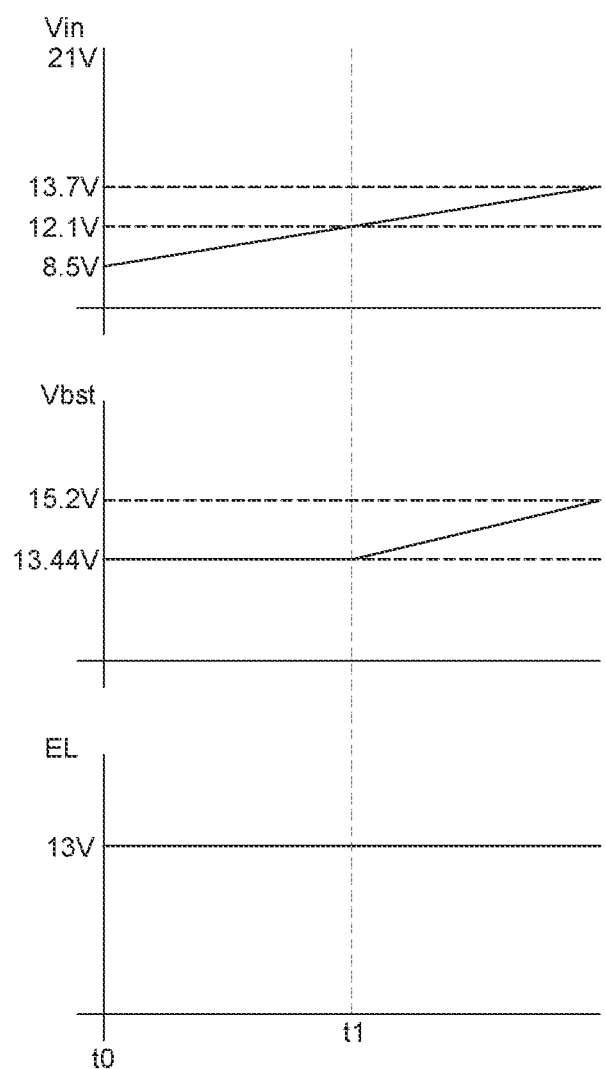
FIG. 6 is a voltage waveform diagram of the display device according to the embodiment of the present disclosure.

FIG. 6 is a voltage waveform diagram of the display device according to the embodiment of the present disclosure.

As illustrated in FIG. 6, the input voltage Vin can sequentially increase over time. Specifically, the external system connected to the power supplier 140 can be modified in various forms such as a power battery and a power adapter. Therefore, the input voltage Vin can also vary. For example, the input voltage Vin can be 8.5 V at a point in time t0 and 12.1 V at a point in time t1 and can increase up to 13.7 V.

Further, the driving voltage Vout required to operate the display device 100 is fixed to a predetermined voltage. For example, the driving voltage Vout can be fixed to 13 V at all points in time.

Therefore, the 1-1 reference voltage calculator 145-1 can set the 1-1 reference voltage Vref1-1 to R2/(R1+R2)*Vin/(1−Dmin) by using the variable input voltage Vin. For example, the input voltage Vin is linearly proportional to the time, such that the 1-1 reference voltage Vref1-1 can also be linearly proportional to the time.

Further, the 1-2 reference voltage calculator 145-2 can set the 1-2 reference voltage Vref1-2 to R2/(R1+R2)*Vout/

Dmax by using the fixed driving voltage Vout. For example, because the driving voltage Vout is constantly fixed, the 1-2 reference voltage Vref1-2 can also be constantly fixed.

In a first time section (section t0 to t1), the fixed 1-2 reference voltage Vref1-2 can be higher than the variable 1-1 reference voltage Vref1-1. Therefore, the first reference voltage output part 145-3 can output the fixed 1-2 reference voltage Vref1-2, as the first reference voltage Vref1, to the first feedback unit 143, thereby outputting the fixed boost voltage Vbst. For example, in FIG. 6, in the first time section (section t0 to t1), the boost voltage Vbst can be fixed to 13.44 V.

Further, in a second time section (section after t1), the variable 1-1 reference voltage Vref1-1 can be higher than the fixed 1-2 reference voltage Vref1-2. Therefore, the first reference voltage output part 145-3 can output the variable 1-1 reference voltage Vref1-1, as the first reference voltage Vref1, to the first feedback unit 143, thereby outputting the variable boost voltage Vbst. For example, in FIG. 6, in the second time section (section after t1), the boost voltage Vbst can linearly increase from 13.44 V to 15.2 V.

In the related art, the boost voltage Vbst is fixed to a predetermined voltage. Specifically, even in a case in which the input voltage inputted to the first converter is 12 V or 20 V, the boost voltage is raised to 24 V and outputted. Further, the boost voltage of 24 V inputted to the second converter is lowered to 13 V, which is the driving voltage, and outputted.

For example, the efficiency of the first converter according to the input and output voltages and currents in the case in which the input voltage is 12 V or 20 V in the display device in the related art is shown in Table 1.

TABLE 1

| Boost Converter | vin (V) | Iin (A) | Vout (V) | Iout (A) | Efficiency (%) |
| --- | --- | --- | --- | --- | --- |
| 12 V | 12.09 | 0.354 | 23.21 | 0.178 | 96.53073 |
| 20 V | 20.14 | 0.215 | 23.22 | 0.177 | 94.91559 |

Further, the efficiency of the second converter according to the input and output voltages and currents in the case in which the input voltage is 12 V or 20 V in the display device in the related art is shown in Table 2.

TABLE 2

| Buck Converter | vin (V) | Iin (A) | Vout (V) | Iout (A) | Efficiency (%) |
| --- | --- | --- | --- | --- | --- |
| 12 V | 23.21 | 0.178 | 13.2 | 0.26 | 83.07152 |
| 20 V | 23.22 | 0.177 | 13.19 | 0.26 | 83.44161 |

When the input voltage is 12 V in the display device in the related art, the final efficiency of the power supplier is 80.19% (=96.53073%×83.071525). When the input voltage Vin is 20 V, the final efficiency of the power supplier is 79.20% (=94.91559×83.44161).

In contrast, in the case of the display device according to the embodiment of the present disclosure, the boost voltage Vbst can vary for each time section. For example, as illustrated in FIG. 6, when the input voltage Vin inputted to the first converter 141 is 8.5 V to 12.1 V (in the case of the first time section), the boost voltage Vbst can be fixed to 13.44 V. When the input voltage Vin inputted to the first converter 141 is 12.1 V or higher (in the case of the second time section), the boost voltage Vbst can linearly increase.

Further, the boost voltage Vbst inputted to the second converter 142 is lowered to 13 V, which is the driving voltage Vout, and outputted.

For example, the efficiency of the first converter 141 according to the input and output voltages and currents when the input voltage Vin is 12 V or 20 V in the display device 100 according to the embodiment of the present disclosure is shown in Table 3.

TABLE 3

| Boost Converter | vin (V) | Iin (A) | Vout (V) | Iout (A) | Efficiency (%) |
| --- | --- | --- | --- | --- | --- |
| 12 V | 12.19 | 0.333 | 14.8 | 0.26 | 94.79537 |
| 20 V | 20.2 | 0.205 | 19.92 | 0.205 | 98.61386 |

Further, the efficiency of the second converter 142 according to the input and output voltages and currents when the input voltage is 12 V or 20 V in the display device 100 according to the embodiment of the present disclosure is shown in Table 4.

TABLE 4

| Buck Converter | vin (V) | Iin (A) | Vout (V) | Iout (A) | Efficiency (%) |
| --- | --- | --- | --- | --- | --- |
| 12 V | 14.8 | 0.26 | 13.21 | 0.262 | 89.94335 |
| 20 V | 19.92 | 0.205 | 13.21 | 0.261 | 84.43065 |

In the display device 100 according to the embodiment of the present disclosure, the final efficiency of power supplier 140 is 85.26% (=94.79537%×89.94335%) when the input voltage Vin is 12 V. When the input voltage Vin is 20 V, the final efficiency of the power supplier 140 is 83.26% (=98.61386%×84.43065%).

For example, it can be seen that when the input voltage Vin is 12 V, the final efficiency of the power supplier 140 of the display device 100 according to the embodiment of the present disclosure increases by 5.07% in comparison with the display device in the related art. It can be seen that the final efficiency of the power supplier 140 increases by 5.07% when the input voltage Vin is 20 V.

For example, according to the display device according to the embodiment of the present disclosure, the efficiency of the first converter can be improved by reducing the input/output voltage difference of the first converter by changing the boost voltage. Further, the efficiency of the second converter can be improved by reducing the input/output voltage difference of the second converter. Therefore, the display device according to the embodiment of the present disclosure can improve the final efficiency of the power supplier.

Hereinafter, a power drive part 240 of a display device according to another embodiment of the present disclosure will be described. The power drive part 240 of the display device according to the embodiment of the present disclosure differs from the power drive parts 140 and 340 of the display device according to the other embodiments of the present disclosure only in terms of a mode controller 246. Therefore, the difference will be specifically described.

Figure 7:
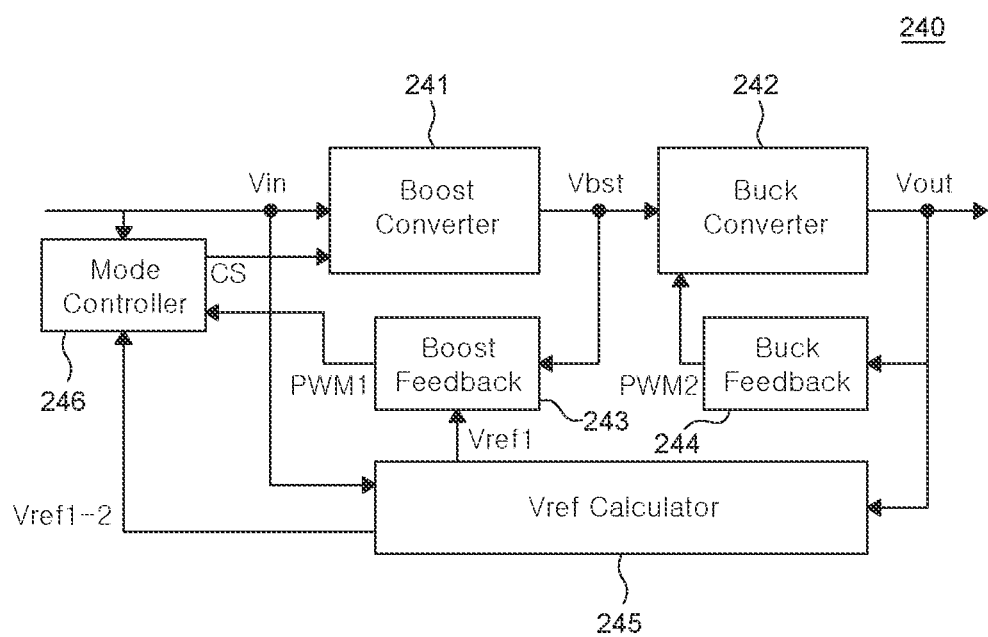
FIG. 7 is a block diagram of a power supplier of a display device according to another embodiment of the present disclosure.

FIG. 7 is a block diagram of a power supplier of a display device according to another embodiment of the present disclosure.

Figure 8:
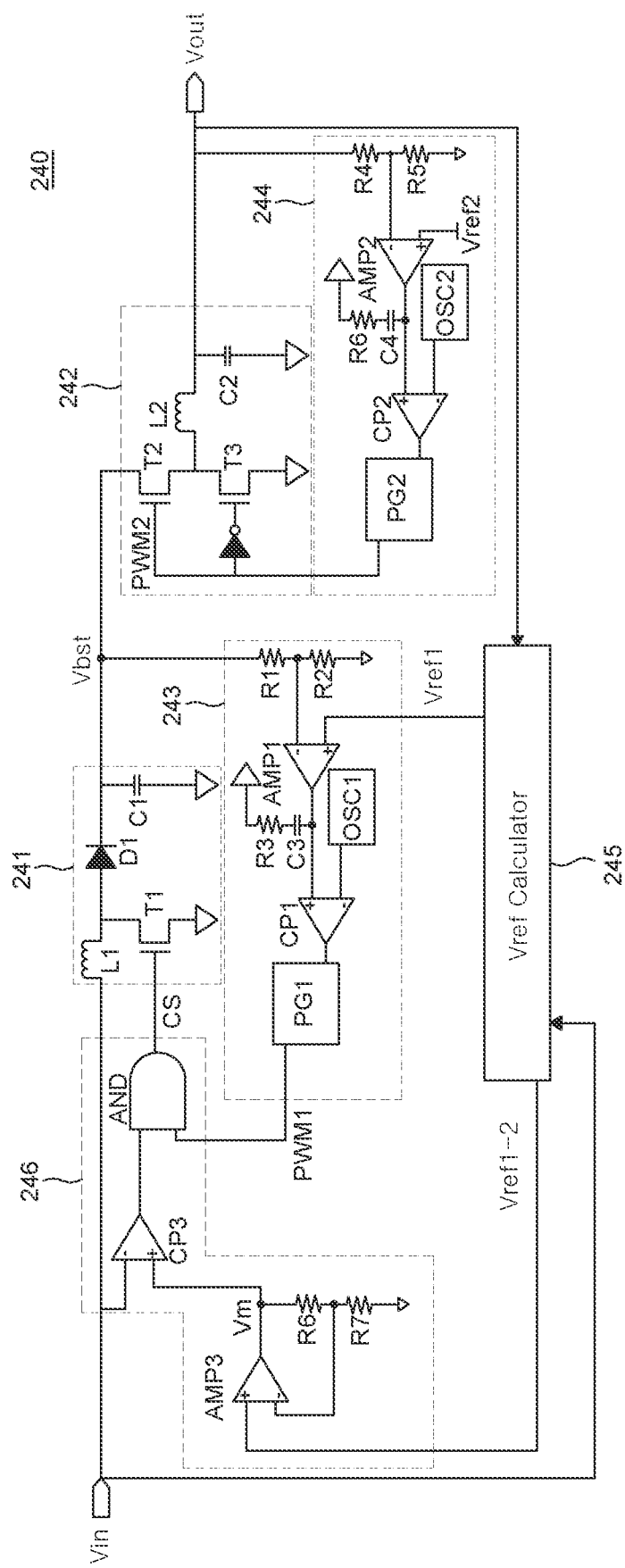
FIG. 8 is a circuit diagram of the power supplier of the display device according to another embodiment of the present disclosure.

FIG. 8 is a circuit diagram of the power supplier of the display device according to another embodiment of the present disclosure.

Referring to FIG. 7, the power supplier 240 includes a first converter (boost converter) 241, a second converter (buck converter) 242, a first feedback unit (boost feedback) 243, a second feedback unit (buck feedback) 244, a reference voltage calculator (Vref calculator) 245, and the mode controller 246.

The mode controller 246 receives the 1-2 reference voltage Vref1-2 and the input voltage Vin and determines whether to operate in a normal mode or a bypass mode.

The configuration in which the first converter 241 operates in the normal mode means that the first transistor T1 is repeatedly switched in response to the first PWM signal PWM1 outputted from the first feedback unit 243, such that the first converter 241 outputs the boost voltage Vbst as (R1+R2)/R1*Vref1, as described above with reference to the display device according to the above-mentioned embodiment of the present disclosure.

For example, in the normal mode, the first converter 241 is controlled by the first feedback unit 243 and outputs the boost voltage Vbst in proportion to the first reference voltage Vref1.

Further, the configuration in which the first converter 241 operates in the bypass mode means that the first transistor T1 is turned off, and the first converter 241 bypasses the input voltage Vin through the first inductor L1 and the first diode D1 and outputs the boost voltage Vbst as the input voltage Vin. However, because the boost voltage Vbst is outputted through the first diode D1, a voltage difference can occur by a Schottky diode voltage between the input voltage Vin and the boost voltage Vbst.

For example, in the bypass mode, the first converter 241 bypasses the input voltage Vin and outputs the boost voltage Vbst.

Specifically, referring to FIG. 8, the mode controller 246 includes a third comparator CP3, an AND gate AND, a third amplifier AMP3, and a plurality of resistors R6 and R7.

The third amplifier AMP3 amplifies the 1-2 reference voltage Vref1-2 to a mode voltage Vm. Specifically, the third comparator CP3 and the sixth resistor R6 and the seventh resistor R7, which are connected in series in series, are connected to an output port of the third amplifier AMP3. An inverting terminal of the third amplifier AMP3 is connected between the sixth resistor R6 and the seventh resistor R7. A non-inverting terminal of the third amplifier AMP3 is connected to the reference voltage calculator 245. Therefore, the third amplifier AMP3 receives the 1-2 reference voltage Vref1-2, amplifies the mode voltage Vm to the (R6+R7)/R7*Vref1-2, and outputs the mode voltage.

The third comparator CP3 can compare the input voltage Vin and the mode voltage Vm and outputs a comparison value. The input voltage Vin is applied to the inverting terminal of the third comparator CP3. The mode voltage Vm is applied to the non-inverting terminal of the third comparator CP3.

When the input voltage Vin is lower than the mode voltage Vm, the comparison signal at an ON level (or high level) is outputted to the AND gate AND. When the input voltage Vin is higher than the mode voltage Vm, the comparison signal at an OFF level (or low level) is outputted to the AND gate AND.

Further, the AND gate AND can receive the comparison signal from the third comparator and the first PWM signal PWM1 from the first feedback unit 243 and control the first transistor T1 of the first converter 241.

Specifically, when the comparison signal at the ON level is applied to the AND gate AND, a control signal CS identical to the first PWM signal PWM1 is outputted, such that the first transistor T1 is periodically switched. Therefore, the first transistor T1 is repeatedly switched in response to the control signal CS identical to the first PWM signal PWM1, such that the first converter 241 can output the boost voltage Vbst as (R1+R2)/R1*Vref1.

For example, when the comparison signal at the ON level is applied to the AND gate AND, the first converter 241 operates in the normal mode.

Further, when the comparison signal at the OFF level is applied to the AND gate AND, the control signal CS at the OFF level (or low level) is outputted, such that the first transistor T1 is turned off. Therefore, the first converter 241 can output the input voltage Vin without change through the first inductor L1 and the first diode D1, thereby outputting the boost voltage Vbst as the input voltage Vin. However, because the boost voltage Vbst is outputted through the first diode D1, a voltage difference can occur by a Schottky diode voltage between the input voltage Vin and the boost voltage Vbst.

When the comparison signal at the OFF level is applied to the AND gate AND, the first converter 241 operates in the bypass mode.

Figure 9:
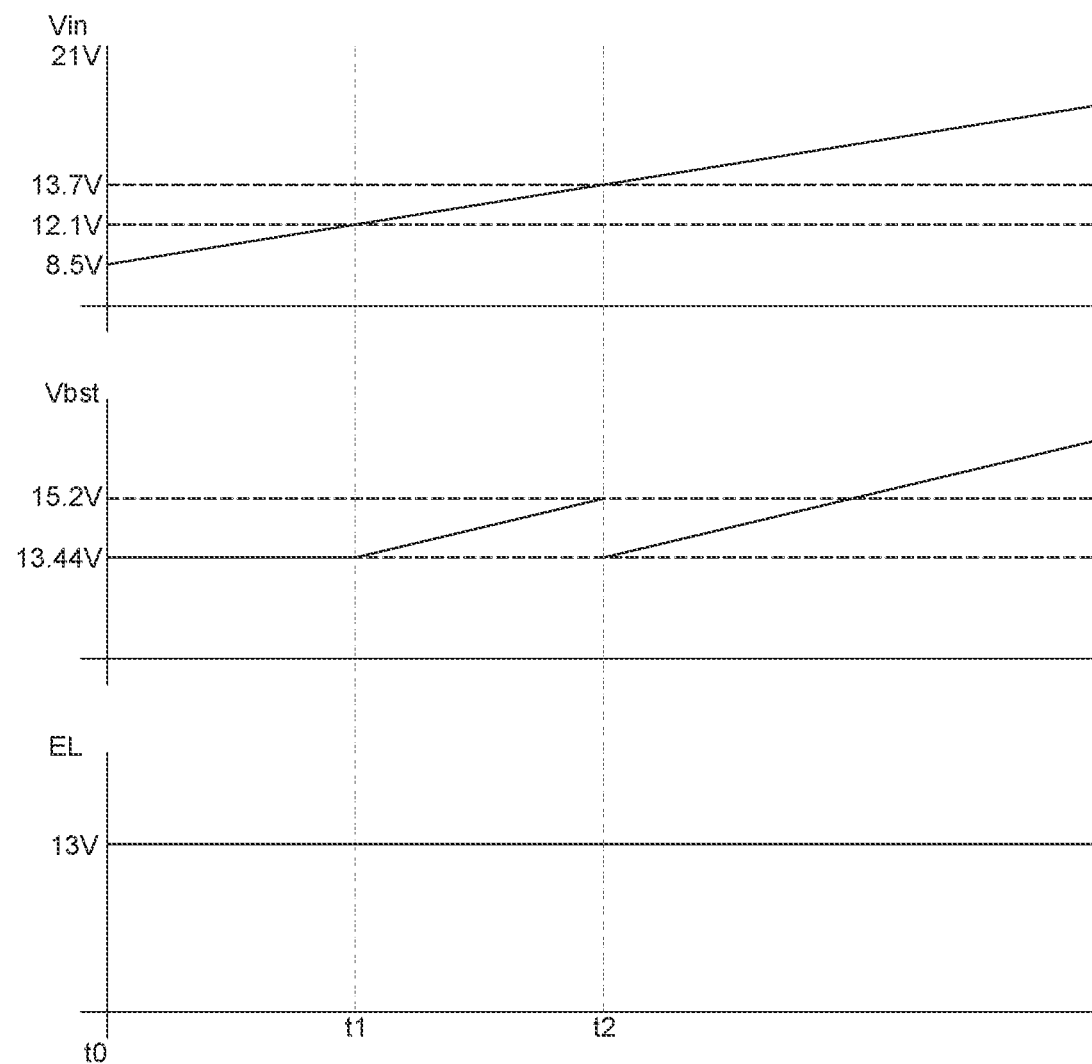
FIG. 9 is a voltage waveform diagram of the display device according to another embodiment of the present disclosure.

FIG. 9 is a voltage waveform diagram of the display device according to another embodiment of the present disclosure.

In the first time section (section t0 to t1) and the second time section (section t1 to t2), the input voltage Vin can be lower than the mode voltage Vm. Therefore, the comparison signal at the ON level is applied to the AND gate AND, such that the normal mode in which the first converter 241 is controlled by the first feedback unit 243 can be implemented.

Therefore, referring to FIG. 6, in the embodiment of the present disclosure described above, the 1-2 reference voltage Vref1-2 fixed in the first time section (section t0 to t1) is outputted, as the first reference voltage Vref1, to the first feedback unit 243, such that the fixed boost voltage Vbst can be outputted. For example, in the first time section (section t0 to t1), the boost voltage Vbst can be fixed to 13.44 V. Further, in the second time section (section t1 to t2), the variable 1-1 reference voltage Vref1-1, as the first reference voltage Vref1, can be outputted to the first feedback unit 243, such that the variable boost voltage Vbst can be outputted. For example, in FIG. 9, in the second time section (section t1 to t2), the boost voltage Vbst can linearly increase from 13.44 V to 15.2 V.

In a third time section (section after t2), the input voltage Vin can be higher than the mode voltage Vm. Therefore, the comparison signal at the OFF level is applied to the AND gate AND, such that the bypass mode in which the first converter 241 outputs the input voltage Vin through the first diode D1 can be implemented.

In the third time section (section after t2), the input voltage Vin can be outputted as the boost voltage Vbst through the first diode D1. Therefore, as illustrated in FIG. 9, in the third time section (section after t2), the boost voltage Vbst can correspond to the input voltage Vin. However, because the boost voltage Vbst is outputted through the first diode D1, there can occur a voltage difference by a Schottky diode voltage of 0.26 V between the input voltage Vin of 13.7 V and the boost voltage Vbst of 13.44 V based on the point in time t2.

In the display device in the related art, the normal operation in which the transistor is repeatedly switched and outputs the boost voltage in response to the PWM signal is continuously performed even though the input voltage increases. For this reason, a ripple of the driving voltage can occur because of the PWM signal.

However, according to the display device according to another embodiment of the present disclosure, when the input voltage increases, the transistor is not switched in response to the PWM signal, but the input voltage is bypassed by the boost voltage. Therefore, in the display device according to another embodiment of the present disclosure, the input voltage is bypassed by the boost voltage, such that no ripple occurs.

Therefore, the driving voltage of the display device according to another embodiment of the present disclosure is not affected by the ripple, thereby minimizing the power consumption caused by the ripple.

Hereinafter, a power drive part 340 of a display device according to still another embodiment of the present disclosure will be described. The power drive part 340 of the display device according to the embodiment of the present disclosure differs from the power drive parts 140 and 240 of the display device according to the above-mentioned embodiments of the present disclosure only in terms of a feedback voltage calculator 345 and a first feedback unit 343. Therefore, the difference will be specifically described.

Figure 10:
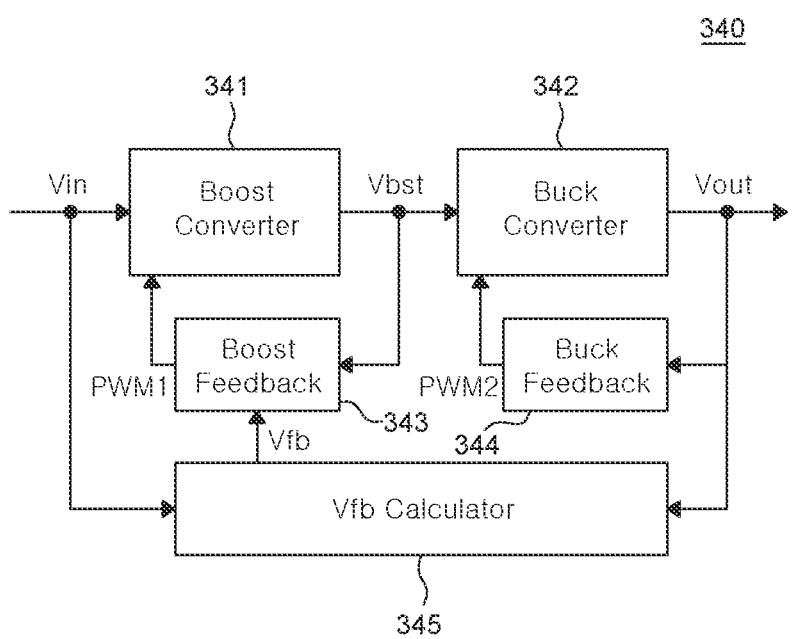
FIG. 10 is a block diagram of the power supplier of the display device according to still another embodiment of the present disclosure.

FIG. 10 is a block diagram of the power supplier of the display device according to still another embodiment of the present disclosure.

Referring to FIG. 10, the power supplier 340 includes a first converter (boost converter) 341, a second converter (buck converter) 342, a first feedback unit (boost feedback) 343, a second feedback unit (buck feedback) 344, and a feedback voltage calculator (Vfb calculator) 345.

The first converter 341 raises an input voltage Vin, which is supplied from the external system to a boost voltage Vbst. For example, the first converter 341 can be a boost converter or a step-up converter that converts the input voltage Vin into the boost voltage Vbst by raising the input voltage Vin.

The second converter 342 lowers the raised boost voltage Vbst to a driving voltage Vout required to operate the display device 100. For example, the second converter 342 can be a buck converter or a step-down converter that converts the boost voltage Vbst into the driving voltage Vout by lowering the boost voltage Vbst.

The first feedback unit 343 controls the first converter 341 so that the first converter 341 can output the constant boost voltage Vbst. For example, the first feedback unit 343 generates a first PWM signal PWM1 and outputs the first PWM signal PWM1 to the first converter 341 so that the boost voltage Vbst can be maintained at a predetermined level in proportion to the first reference voltage.

The second feedback unit 344 controls the second converter 342 so that the second converter 342 can maintain the driving voltage Vout. For example, the second feedback unit 344 generates a second PWM signal PWM2 and outputs the second PWM signal PWM2 to the second converter 342 so that the driving voltage Vout can be maintained at a predetermined level in accordance with a second reference voltage.

The feedback voltage calculator 345 calculates a feedback voltage Vfb and outputs the feedback voltage Vfb to the first feedback unit 343 so that the power supplier 340 can operate with maximum efficiency. For example, the feedback voltage calculator 345 receives the input voltage Vin and the driving voltage Vout, calculates the feedback voltage Vfb in accordance with the input voltage Vin and the driving voltage Vout, and outputs the feedback voltage Vfb to the first feedback unit 343.

Hereinafter, a specific circuit configuration will be described with reference to FIG. 11, focusing on the first feedback unit 343 of the display device according to still another embodiment of the present disclosure.

Figure 11:
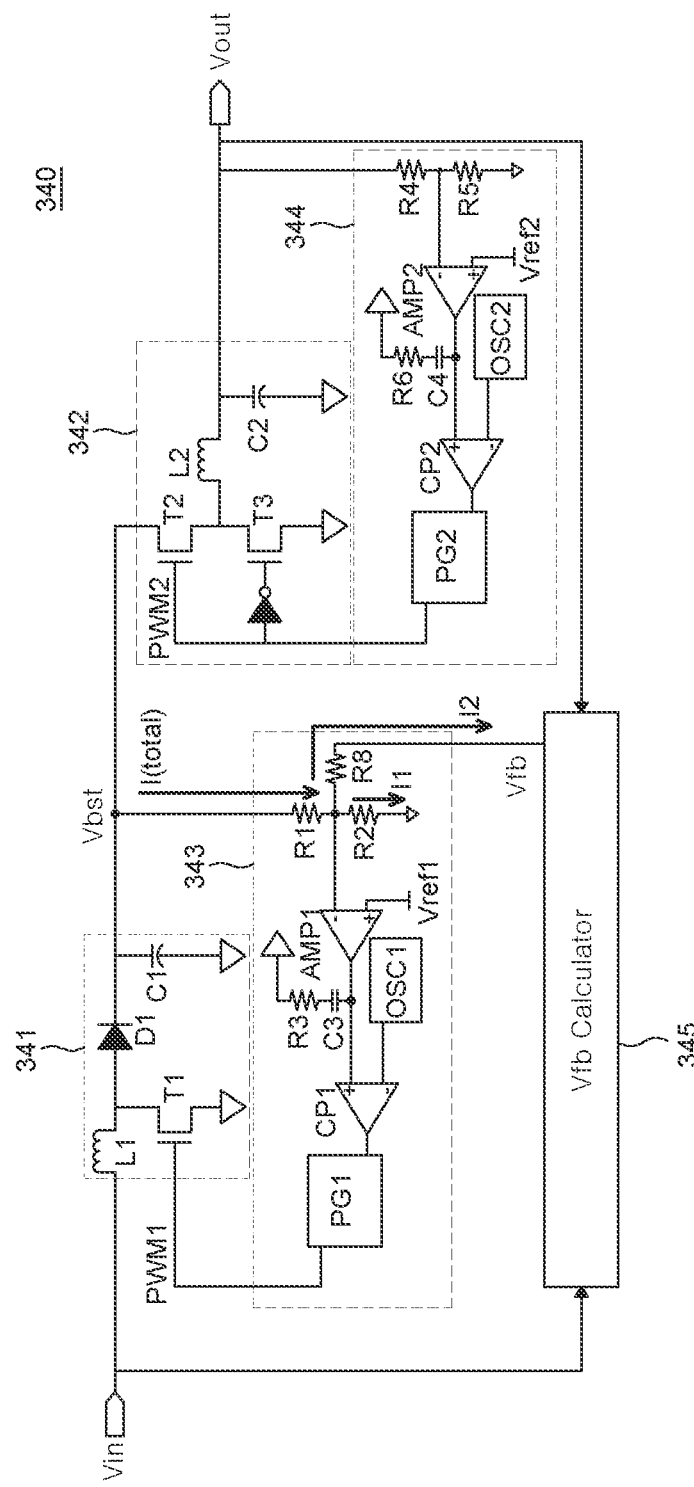
FIG. 11 is a circuit diagram of a power supplier of a display device according to still another embodiment of the present disclosure.

FIG. 11 is a circuit diagram of a power supplier of a display device according to still another embodiment of the present disclosure.

Referring to FIG. 11, the first feedback unit 343 includes a plurality of resistors R1, R2, R3, and R8, a third capacitor C3, a first amplifier AMP1, a first oscillator OSC 1, a first comparator CP1, and a first PWM generator PG1.

The first resistor R1 and the second resistor R2 are connected in series. The first resistor R1 and the second resistor R2, which are connected in series, are connected between an output port of the first converter 341 and a grounding terminal. Therefore, the first resistor R1 and the second resistor R2, which are connected in series, serve as voltage distributors that distribute the boost voltage Vbst. Therefore, the boost voltage Vbst distributed between the first resistor R1 and the second resistor R2 can be expressed as R2/(R1+R2)*Vbst.

Further, in the display device according to still another embodiment of the present disclosure, the inverting terminal of the first amplifier AMP1, which is a node between the first resistor R1 and the second resistor R2, can be connected to the feedback voltage calculator 345 through the eighth resistor R8, which is any one of the plurality of resistors. For example, one end of the eighth resistor R8 is connected to an inverting terminal of the first amplifier AMP1 that is a node between the first resistor R1 and the second resistor R2. The other end of the eighth resistor R8 is connected to the feedback voltage calculator 345.

In other words, the inverting terminal of the first amplifier AMP1 is connected to the output port of the first converter 341 through another R1 of the plurality of resistors. The inverting terminal of the first amplifier AMP1 is connected to the grounding terminal through another R2 of plurality of resistors.

The first resistor R1 and the second resistor R2 can be connected to an inverting terminal of the first amplifier AMP1, and the distributed boost voltage (R2/(R1+R2)*Vbst) can be applied. Further, the first reference voltage Vref1 can be applied to the non-inverting terminal of the first amplifier AMP1. However, in the display device according to still another embodiment of the present disclosure, the first reference voltage Vref1 can be fixed without varying, unlike the display device according to the above-mentioned embodiment of the present disclosure.

Since the voltage at the inverting terminal of the first amplifier AMP1 and the voltage at the non-inverting terminal of the first amplifier AMP1 are equal to each other, the first reference voltage Vref1 can be the distributed boost voltage (R2/(R1+R2)*Vbst). Further, the third resistor R3 and the third capacitor C3, which are connected in series, are connected to an output terminal of the first amplifier AMP1, thereby stabilizing an output voltage of the first amplifier AMP1. For example, the first amplifier AMP1 derives a difference value between the distributed boost voltage (R2/(R1+R2)*Vbst) and the first reference voltage Vref1 and outputs an amplified value of the difference value.

Further, a first oscillator OSC1 can be connected to the inverting terminal of the first comparator CP1, such that a triangular wave outputted from the first oscillator OSC1 can be applied. Further, the first amplifier AMP1 can be connected to the non-inverting terminal of the first comparator CP1, such that an output value of the first amplifier AMP1 can be applied. Further, the first PWM generator PG1 is connected to the output terminal of the first amplifier AMP1. For example, the first comparator CP1 outputs, to the first PWM generator PG1, a result value made by comparing the output value of the first amplifier AMP1 with the triangular wave outputted from the first oscillator OSC1.

The first PWM generator PG1 receives the output value of the first comparator CP1 and outputs, to the first converter 341, the first PWM signal PWM1 having a duty made by reflecting the output value of the first comparator CP1. Therefore, the first transistor T1 of the first converter 341 performs an ON/OFF switching operation corresponding to the first PWM signal PWM1, such that the first converter 341 converts the input voltage Vin to the boost voltage Vbst in accordance with the duty of the first PWM signal PWM1.

Figure 12:
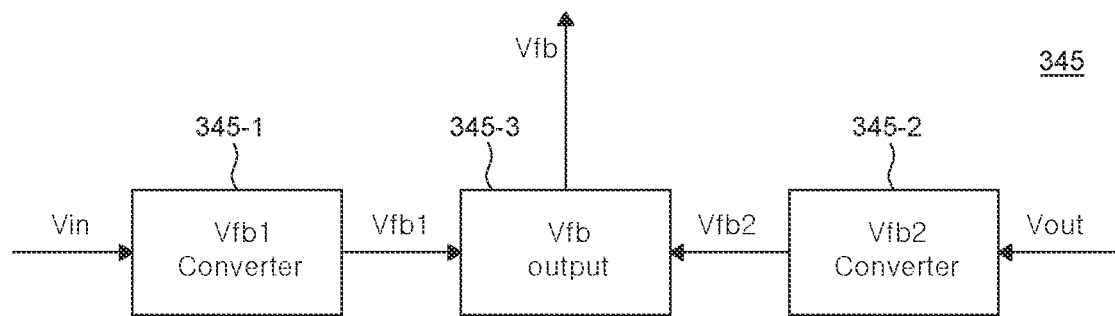
FIG. 12 is a block diagram of a feedback voltage calculator of the display device according to still another embodiment of the present disclosure.

FIG. 12 is a block diagram of a feedback voltage calculator of the display device according to still another embodiment of the present disclosure.

Figure 13A:
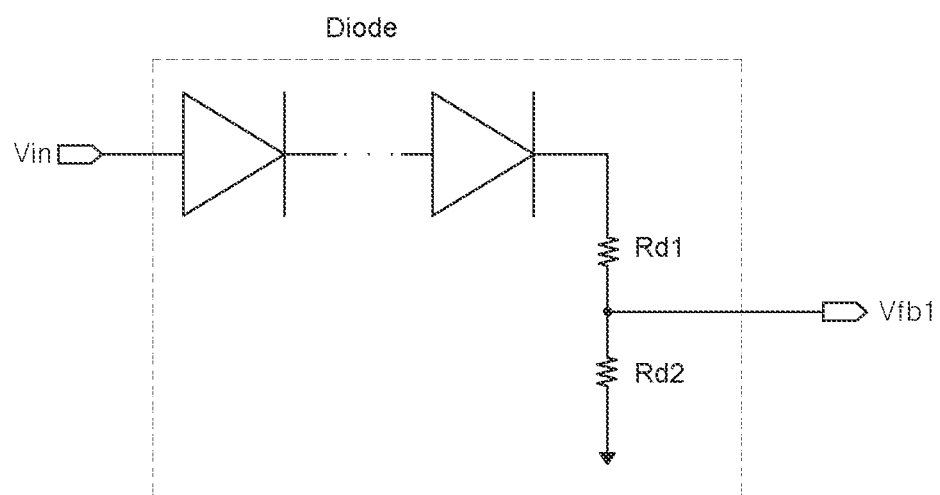
FIG. 13A is a circuit diagram of a first feedback voltage converter of the display device according to still another embodiment of the present disclosure.

FIG. 13A is a circuit diagram of a first feedback voltage converter of the display device according to still another embodiment of the present disclosure.

Figure 13B:
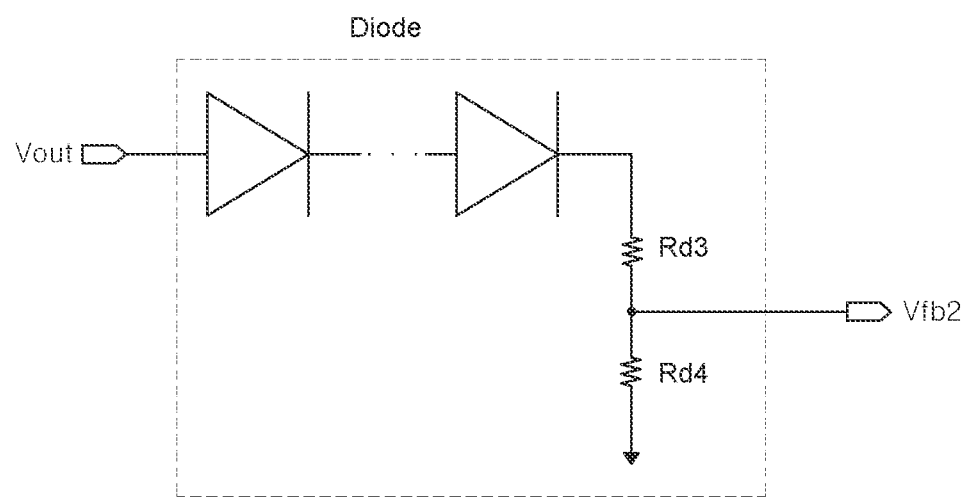
FIG. 13B is a circuit diagram of a second feedback voltage converter of the display device according to still another embodiment of the present disclosure.

FIG. 13B is a circuit diagram of a second feedback voltage converter of the display device according to still another embodiment of the present disclosure.

Figure 14:
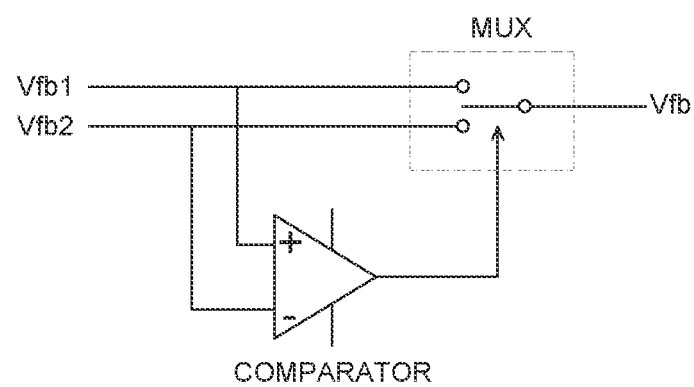
FIG. 14 is a circuit diagram of a feedback voltage output part of the display device according to still another embodiment of the present disclosure.

FIG. 14 is a circuit diagram of a feedback voltage output part of the display device according to still another embodiment of the present disclosure.

Referring to FIG. 12, the feedback voltage calculator 345 includes a first feedback voltage converter 345-1, a second feedback voltage converter 345-2, and a feedback voltage output part 345-3.

The first feedback voltage converter 345-1 receives the input voltage Vin and converts the input voltage Vin into a first feedback voltage Vfb1. The first feedback voltage Vfb1 means a minimum voltage that allows the first converter 341 to operate.

Specifically, the first feedback voltage converter 345-1 lowers the input voltage Vin, distributes the lowered input voltage Vin, and outputs the first feedback voltage Vfb1. For example, the first feedback voltage converter 345-1 can lower the level of the input voltage Vin to the first reference voltage Vref1 or lower and output the first feedback voltage Vfb1.

As illustrated in FIG. 13A, the first feedback voltage converter 345-1 can include a plurality of diodes and a plurality of resistors Rd1 and Rd2 that are connected in series.

Therefore, the first feedback voltage converter 345-1 converts the input voltage Vin through the plurality of diodes, distributes the input voltage Vin lowered through the plurality of resistors Rd1 and Rd2, and outputs the first feedback voltage Vfb1. Therefore, the first feedback voltage Vfb1 can be lower than the first reference voltage Vref1.

The second feedback voltage converter 345-2 receives the driving voltage Vout and converts the driving voltage Vout into a second feedback voltage Vfb2. The second feedback voltage Vfb2 means a minimum voltage that allows the second converter 342 to operate.

Specifically, the second feedback voltage converter 345-2 lowers the driving voltage Vout, distributes the lowered driving voltage Vout, and outputs the second feedback voltage Vfb2. For example, the second feedback voltage converter 345-2 can lower the level of the driving voltage Vout to the first reference voltage Vref1 or lower and output the second feedback voltage Vfb2.

As illustrated in FIG. 13B, the second feedback voltage converter 345-2 can include a plurality of diodes and a plurality of resistors Rd3 and Rd4 that are connected in series.

Therefore, the second feedback voltage converter 345-2 converts the driving voltage Vout through the plurality of diodes, distributes the driving voltage Vout lowered through the plurality of resistors Rd3 and Rd4, and outputs the second feedback voltage Vfb2. Therefore, the second feedback voltage Vfb2 can be lower than the first reference voltage Vref1.

The feedback voltage output part 345-3 outputs a large value between the first feedback voltage Vfb1 and the second feedback voltage Vfb2, as the feedback voltage Vfb. As described above, the first feedback voltage converter 345-1 outputs the first feedback voltage Vfb1 that is a minimum voltage for operating the first converter 341. The second feedback voltage converter 345-2 outputs the second feedback voltage Vfb2 that is a minimum voltage for operating the second converter 342. Further, both the first converter 341 and the second converter 342 need to operate to operate the power supplier 340.

Therefore, the feedback voltage output part 345-3 outputs a larger value between the first feedback voltage Vfb1 and the second feedback voltage Vfb2, as the feedback voltage Vfb, in order to operate both the first converter 341 and the second converter 342.

Referring to FIG. 14, the feedback voltage output part 345-3 includes a multiplexer MUX and a comparator that receive the first feedback voltage Vfb1 and the second feedback voltage Vfb2.

The comparator compares the first feedback voltage Vfb1 and the second feedback voltage Vfb2 and outputs the comparison result value to the multiplexer MUX.

Further, depending on the result value of the comparator, the multiplexer MUX outputs a voltage having higher electric potential between the first feedback voltage Vfb1 and the second feedback voltage Vfb2, as the feedback voltage Vfb.

Meanwhile, referring to FIG. 11, because the voltage at the non-inverting terminal of the first amplifier AMP1 and the voltage at the inverting terminal of the first amplifier AMP1 are equal to each other, the first reference voltage Vref1 is applied to the non-inverting terminal of the first amplifier AMP1.

Therefore, a first current I1 flowing through the second resistor R2 can be expressed as Vref1/R2, and a second current I2 flowing through the eighth resistor R8 can be expressed as (Vref1−Vfb)/R8. Therefore, the current I (total) flowing through the first resistor R1 is a sum of the first current I1 and the second current I2 and thus be expressed as (Vref1/R2+(Vref1−Vfb)/R8).

Therefore, the boost voltage Vbst can be expressed as a sum of voltage applied to the first reference voltage Vref1 and the first resistor R1. For example, the boost voltage Vbst can be expressed as (Vref1+{Vref1/R2+(Vref1−Vfb)/R8}*R1). In summary, based on the boost voltage Vbst, the voltage can be expressed as (Vref1(1+R1/R2+R1/R8)−Vfb (R1/R8)).

For example, because the boost voltage Vbst varies depending on the feedback voltage Vfb, the boost voltage Vbst can be controlled by adjusting the feedback voltage Vfb.

In other words, according to the display device according to another embodiment of the present disclosure, the boost voltage Vbst can be controlled by adjusting the feedback voltage Vfb applied to the first feedback unit 343 that controls the first converter 341.

According to the display device according to still another embodiment of the present disclosure, the efficiency of the first converter can be improved by reducing the input/output voltage difference of the first converter by changing the boost voltage. Further, the efficiency of the second converter can be improved by reducing the input/output voltage difference of the second converter. Therefore, the display device according to still another embodiment of the present disclosure can improve the final efficiency of the power supplier.

The exemplary embodiments of the present disclosure can also be described as follows:

According to an aspect of the present disclosure, a display device can include a display panel having a plurality of pixels disposed on a substrate, and a power supplier configured to supply a driving voltage to the display panel. The power supplier can include a first converter configured to receive an input voltage supplied from an external system and convert the input voltage into a boost voltage, a second converter configured to convert the boost voltage into the driving voltage, a first feedback unit configured to output a first PWM signal to the first converter so that the boost voltage is proportional to a first reference voltage, a second feedback unit configured to output a second PWM signal to the second converter so that the driving voltage is proportional to a second reference voltage, and a reference voltage calculator configured to receive the input voltage and the driving voltage and supply the first reference voltage to the first feedback unit. Therefore, it is possible to improve the power conversion efficiency of the power supplier.

The first converter can be a boost converter including a first inductor, a first diode, a first transistor, and a first capacitor, and the first transistor can perform a switching operation corresponding to the first PWM signal, such that the first converter can convert the input voltage into the boost voltage in accordance with a duty of the first PWM signal.

The first feedback unit can include a plurality of resistors, a first amplifier, and a first PWM generator, the plurality of resistors distributes the boost voltage, the distributed boost voltage can be applied to an inverting terminal of the first amplifier, the first reference voltage can be applied to a non-inverting terminal of the first amplifier, and the first PWM generator can output the first PWM signal so that the distributed boost voltage and the first reference voltage are equal to each other.

The second converter can be a buck converter including a second inductor, a second transistor, a third transistor, and a second capacitor, and the second transistor and the third transistor can perform switching operations corresponding to the second PWM signal, so that the second converter can convert the boost voltage into the driving voltage in accordance with a duty of the second PWM signal.

The second feedback unit can include a plurality of resistors, a second amplifier, and a second PWM generator, the plurality of resistors distributes the driving voltage, the distributed driving voltage can be applied to an inverting terminal of the second amplifier, the second reference voltage can be applied to an non-inverting terminal of the second amplifier, and the second PWM generator can output the second PWM signal so that the distributed driving voltage and the second reference voltage are equal to each other.

The reference voltage calculator can include a 1-1 reference voltage calculator, a 1-2 reference voltage calculator, and a first reference voltage output part, the 1-1 reference voltage calculator can calculate a 1-1 reference voltage based on the input voltage, the 1-2 reference voltage calculator can calculate a 1-2 reference voltage based on the driving voltage, and the first reference voltage output part can output, as the first reference voltage, a voltage at a higher level between the 1-1 reference voltage and the 1-2 reference voltage.

The 1-1 reference voltage can be a minimum voltage that allows the first converter to operate, and the 1-2 reference voltage can be a minimum voltage that allows the second converter to operate.

The input voltage can be variable, and the 1-1 reference voltage varies depending on the input voltage.

The driving voltage can be fixed, and the 1-2 reference voltage can be fixed depending on the driving voltage.

The first reference voltage output part can output the 1-2 reference voltage, as the first reference voltage, to the first feedback unit in a first time section, and the first reference voltage output part can output the 1-1 reference voltage, as the first reference voltage, to the first feedback unit in a second time section.

The display device of claim can further comprise a mode controller configured to receive the 1-2 reference voltage and the input voltage and determine whether the first converter can operate in a normal mode or a bypass mode, in the normal mode, the first converter can be controlled by the first feedback unit and can output the boost voltage in proportion to the first reference voltage, and in the bypass mode, the first converter bypasses the input voltage and can output the input voltage as the boost voltage.

The mode controller can include an amplifier, a comparator, and an AND gate, the amplifier amplifies the 1-2 reference voltage to a mode voltage, the comparator can compare the input voltage and the mode voltage, and the AND gate receives the first PWM signal and a comparison signal of the comparator and can output a control signal for controlling the first converter.

The input voltage can be applied to an inverting terminal of the comparator, and the mode voltage can be applied to a non-inverting terminal of the comparator.

The comparator can output a comparison signal at an ON level to the AND gate when the input voltage can be lower than the mode voltage, and the comparator can output a comparison signal at an OFF level to the AND gate when the input voltage can be higher than the mode voltage.

The AND gate can operate the first converter in the normal mode by outputting the control signal identical to the first PWM signal when the comparison signal at the ON level can be applied, and the AND gate can operate the first converter in the bypass mode by outputting the control signal at the OFF level when the comparison signal at the OFF level can be applied.

According to another aspect of the present disclosure, a display device can include a display panel having a plurality of pixels disposed on a substrate, and a power supplier configured to supply a driving voltage to the display panel. The power supplier can include a first converter configured to convert an input voltage, which is supplied from an external system, into a boost voltage, a second converter configured to convert the boost voltage into the driving voltage, a first feedback unit configured to control the first converter so that the first converter outputs the boost voltage, a second feedback unit configured to control the second converter so that the second converter outputs the driving voltage, and a feedback voltage calculator configured to calculate a feedback voltage from the input voltage and the driving voltage. The first feedback unit can include a plurality of resistors, a first amplifier, and a first PWM generator, in which a first reference voltage is applied to a non-inverting terminal of the first amplifier. Further, an inverting terminal of the first amplifier is connected to the feedback voltage calculator through any one of the plurality of resistors, and the first PWM generator outputs a first PWM signal to the first converter so that the boost voltage is proportional to the first reference voltage. Therefore, it is possible to improve the power conversion efficiency of the power supplier.

The first converter can comprise a first inductor, a first diode, a first transistor, and a first capacitor, and the first transistor can perform a switching operation corresponding to the first PWM signal, such that the first converter can convert the input voltage into the boost voltage in accordance with a duty of the first PWM signal.

The inverting terminal of the first amplifier can be connected to an output port of the first converter through another of the plurality of resistors, and the inverting terminal of the first amplifier can be connected to a grounding terminal through another of the plurality of resistors.

The feedback voltage calculator can include a first feedback voltage converter, a second feedback voltage converter, and a feedback voltage output part, the first feedback voltage converter can convert the input voltage into a first feedback voltage by lowering the input voltage to the first reference voltage or lower, the second feedback voltage converter can convert the driving voltage into a second feedback voltage by lowering the driving voltage to the first reference voltage or lower, and the feedback voltage output part can output, as the feedback voltage, a voltage at a higher level between the first feedback voltage and the second feedback voltage.

The first feedback voltage can be a minimum voltage that allows the first converter to operate, and the second feedback voltage can be a minimum voltage that allows the second converter to operate.

Although the exemplary embodiments of the present disclosure have been described in detail with reference to the accompanying drawings, the present disclosure is not limited thereto and can be embodied in many different forms without departing from the technical concept of the present disclosure. Therefore, the exemplary embodiments of the present disclosure are provided for illustrative purposes only but not intended to limit the technical concept of the present disclosure. The scope of the technical concept of the present disclosure is not limited thereto.

Therefore, it should be understood that the above-described exemplary embodiments are illustrative in all aspects and do not limit the present disclosure. The protective scope of the present disclosure should be construed based on the following claims, and all the technical concepts in the equivalent scope thereof should be construed as falling within the scope of the present disclosure.

What is claimed is:

1. A display device comprising:
a display panel including a plurality of pixels disposed on a substrate; and
a power supplier configured to supply a driving voltage to the display panel,
wherein the power supplier comprises:
a first converter configured to receive an input voltage supplied from an external system and convert the input voltage into a boost voltage;
a second converter configured to convert the boost voltage into the driving voltage;
a first feedback unit configured to output a first pulse width modulation (PWM) signal to the first converter so that the boost voltage is proportional to a first reference voltage;
a second feedback unit configured to output a second PWM signal to the second converter so that the driving voltage is proportional to a second reference voltage; and
a reference voltage calculator configured to receive the input voltage and the driving voltage and supply the first reference voltage to the first feedback unit.

2. The display device of claim 1,
wherein the first converter is a boost converter including a first inductor, a first diode, a first transistor, and a first capacitor, and
the first transistor is configured to perform a switching operation corresponding to the first PWM signal, so that the first converter converts the input voltage into the boost voltage in accordance with a duty of the first PWM signal.

3. The display device of claim 2,
wherein the first feedback unit includes a plurality of resistors, a first amplifier, and a first PWM generator,
the plurality of resistors distributes the boost voltage,
the distributed boost voltage is applied to an inverting terminal of the first amplifier,
the first reference voltage is applied to a non-inverting terminal of the first amplifier, and
the first PWM generator is configured to output the first PWM signal so that the distributed boost voltage and the first reference voltage are equal to each other.

4. The display device of claim 1,
wherein the second converter is a buck converter including a second inductor, a second transistor, a third transistor, and a second capacitor, and
the second transistor and the third transistor are configured to perform switching operations corresponding to the second PWM signal, so that the second converter converts the boost voltage into the driving voltage in accordance with a duty of the second PWM signal.

5. The display device of claim 4,
wherein the second feedback unit includes a plurality of resistors, a second amplifier, and a second PWM generator,
the plurality of resistors distributes the driving voltage,
the distributed driving voltage is applied to an inverting terminal of the second amplifier,
the second reference voltage is applied to an non-inverting terminal of the second amplifier, and
the second PWM generator is configured to output the second PWM signal so that the distributed driving voltage and the second reference voltage are equal to each other.

6. The display device of claim 1,
wherein the reference voltage calculator includes a 1-1 reference voltage calculator, a 1-2 reference voltage calculator, and a first reference voltage output part,
the 1-1 reference voltage calculator is configured to calculate a 1-1 reference voltage based on the input voltage,
the 1-2 reference voltage calculator is configured to calculate a 1-2 reference voltage based on the driving voltage, and
the first reference voltage output part is configured to output, as the first reference voltage, a voltage at a higher level between the 1-1 reference voltage and the 1-2 reference voltage.

7. The display device of claim 6,
wherein the 1-1 reference voltage is a minimum voltage that allows the first converter to operate, and the 1-2 reference voltage is a minimum voltage that allows the second converter to operate.

8. The display device of claim 7, wherein the input voltage is variable, and the 1-1 reference voltage varies depending on the input voltage.

9. The display device of claim 7, wherein the driving voltage is fixed, and the 1-2 reference voltage is fixed depending on the driving voltage.

10. The display device of claim 7, wherein the first reference voltage output part is configured to output the 1-2 reference voltage, as the first reference voltage, to the first feedback unit in a first time section, and
the first reference voltage output part is configured to output the 1-1 reference voltage, as the first reference voltage, to the first feedback unit in a second time section.

11. The display device of claim 6, further comprising:
a mode controller configured to receive the 1-2 reference voltage and the input voltage, and determine whether the first converter operates in a normal mode or a bypass mode,
wherein in the normal mode, the first converter is configured to be controlled by the first feedback unit and output the boost voltage in proportion to the first reference voltage, and
wherein in the bypass mode, the first converter is configured to bypass the input voltage and output the input voltage as the boost voltage.

12. The display device of claim 11,
wherein the mode controller includes an amplifier, a comparator, and an AND gate,
the amplifier is configured to amplify the 1-2 reference voltage to a mode voltage,
the comparator is configured to compare the input voltage and the mode voltage, and
the AND gate is configured to receive the first PWM signal and a comparison signal of the comparator and output a control signal for controlling the first converter.

13. The display device of claim 12, wherein the input voltage is applied to an inverting terminal of the comparator, and the mode voltage is applied to a non-inverting terminal of the comparator.

14. The display device of claim 12, wherein the comparator is configured to output a comparison signal at an ON level to the AND gate when the input voltage is lower than the mode voltage, and
the comparator is configured to output a comparison signal at an OFF level to the AND gate when the input voltage is higher than the mode voltage.

15. The display device of claim 14, wherein the AND gate is configured to operate the first converter in the normal mode by outputting the control signal identical to the first PWM signal when the comparison signal at the ON level is applied, and
the AND gate is configured to operate the first converter in the bypass mode by outputting the control signal at the OFF level when the comparison signal at the OFF level is applied.

16. A display device comprising:
a display panel including a plurality of pixels disposed on a substrate; and
a power supplier configured to supply a driving voltage to the display panel,
wherein the power supplier comprises:
a first converter configured to convert an input voltage, which is supplied from an external system, into a boost voltage;
a second converter configured to convert the boost voltage into the driving voltage;
a first feedback unit configured to control the first converter so that the first converter outputs the boost voltage;
a second feedback unit configured to control the second converter so that the second converter outputs the driving voltage; and
a feedback voltage calculator configured to calculate a feedback voltage from the input voltage and the driving voltage,
wherein the first feedback unit includes a plurality of resistors, a first amplifier, and a first pulse width modulator (PWM) generator,
wherein a first reference voltage is applied to a non-inverting terminal of the first amplifier,
wherein an inverting terminal of the first amplifier is connected to the feedback voltage calculator through any one of the plurality of resistors, and
wherein the first PWM generator is configured to output a first PWM signal to the first converter so that the boost voltage is proportional to the first reference voltage.

17. The display device of claim 16,
wherein the first converter comprises a first inductor, a first diode, a first transistor, and a first capacitor, and
the first transistor is configured to perform a switching operation corresponding to the first PWM signal, so that the first converter converts the input voltage into the boost voltage in accordance with a duty of the first PWM signal.

18. The display device of claim 16,
wherein the inverting terminal of the first amplifier is connected to an output port of the first converter through another of the plurality of resistors, and
the inverting terminal of the first amplifier is connected to a grounding terminal through another of the plurality of resistors.

19. The display device of claim 16,
wherein the feedback voltage calculator includes a first feedback voltage converter, a second feedback voltage converter, and a feedback voltage output part,
the first feedback voltage converter is configured to convert the input voltage into a first feedback voltage by lowering the input voltage to the first reference voltage or lower,
the second feedback voltage converter is configured to convert the driving voltage into a second feedback voltage by lowering the driving voltage to the first reference voltage or lower, and
the feedback voltage output part is configured to output, as the feedback voltage, a voltage at a higher level between the first feedback voltage and the second feedback voltage.

20. The display device of claim 19,
wherein the first feedback voltage is a minimum voltage that allows the first converter to operate, and the second feedback voltage is a minimum voltage that allows the second converter to operate.

* * * * *